(12) United States Patent
Yan et al.

(10) Patent No.: US 11,281,897 B2
(45) Date of Patent: Mar. 22, 2022

(54) GESTURE SHAKING RECOGNITION METHOD AND APPARATUS, AND GESTURE RECOGNITION METHOD

(71) Applicants: BEIJING BOE OPTOELECTRONICS TECHNOLOGY CO., LTD., Beijing (CN); BOE Technology Group Co., Ltd., Beijing (CN)

(72) Inventors: Guixin Yan, Beijing (CN); Hao Zhang, Beijing (CN); Lili Chen, Beijing (CN); Jian Sun, Beijing (CN); Wenhong Tian, Beijing (CN); Jinghua Miao, Beijing (CN); Bin Zhao, Beijing (CN); Minglei Chu, Beijing (CN); Ziqiang Guo, Beijing (CN); Jiankang Sun, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 467 days.

(21) Appl. No.: 16/466,908

(22) PCT Filed: Dec. 10, 2018

(86) PCT No.: PCT/CN2018/120051
§ 371 (c)(1),
(2) Date: Jun. 5, 2019

(87) PCT Pub. No.: WO2019/184441
PCT Pub. Date: Oct. 3, 2019

(65) Prior Publication Data
US 2021/0383102 A1    Dec. 9, 2021

(30) Foreign Application Priority Data
Mar. 28, 2018   (CN) .......................... 201810264119.8

(51) Int. Cl.
*G06K 9/00* (2006.01)
*G06T 7/70* (2017.01)
(Continued)

(52) U.S. Cl.
CPC ......... *G06K 9/00355* (2013.01); *G06F 3/017* (2013.01); *G06K 9/00375* (2013.01);
(Continued)

(58) Field of Classification Search
CPC ........... G06K 9/00355; G06K 9/00375; G06K 9/00744; G06F 3/017; G06T 7/246; G06T 7/70
(Continued)

(56) References Cited

U.S. PATENT DOCUMENTS

| | | |
|---|---|---|
| 2010/0277602 A1 | 11/2010 | Asano et al. |
| 2013/0329948 A1 | 12/2013 | Minagawa et al. |
| 2016/0132124 A1 | 5/2016 | Nakamura et al. |

FOREIGN PATENT DOCUMENTS

| | | |
|---|---|---|
| CN | 101316368 A | 12/2008 |
| CN | 103458156 A | 12/2013 |

(Continued)

OTHER PUBLICATIONS

Office Action dated Jul. 1, 2020, issued in counterpart CN Application No. 201810264119.8, with English translation. (24 page).
(Continued)

*Primary Examiner* — Stephen P Coleman
(74) *Attorney, Agent, or Firm* — Westerman, Hattori, Daniels & Adrian, LLP

(57) ABSTRACT

A gesture shaking recognition method includes acquiring two adjacent frames of gesture images of a gesture (S100),
(Continued)

selecting a tracking point in each of the two adjacent frames of gesture images (S200), determining positional information of a maximum value pixel point in each of the two adjacent frames of gesture images based on the tracking point (S300), and determining whether gesture shaking occurs (S400) based on the positional information of the maximum value pixel point in each of the two adjacent frames of gesture images and positional information of the tracking point in each of the two adjacent frames of gesture images. The tracking point in each of the two adjacent frames of gesture images may correspond to a same position on the gesture.

18 Claims, 11 Drawing Sheets

(51) Int. Cl.
*G06F 3/01* (2006.01)
*G06T 7/246* (2017.01)

(52) U.S. Cl.
CPC .......... *G06K 9/00744* (2013.01); *G06T 7/246* (2017.01); *G06T 7/70* (2017.01)

(58) Field of Classification Search
USPC .......................................................... 382/103
See application file for complete search history.

(56) References Cited

FOREIGN PATENT DOCUMENTS

| | | |
|---|---|---|
| CN | 104050488 A | 9/2014 |
| CN | 105430262 A | 3/2016 |
| CN | 106060403 A | 10/2016 |
| CN | 106679648 A | 5/2017 |
| CN | 108446657 A | 8/2018 |
| JP | 2010079815 A | 4/2010 |
| KR | 20140087613 A | 7/2014 |

OTHER PUBLICATIONS

International Search Report dated Mar. 14, 2019, issued in counterpart Application No. PCT/CN2018/120051 (11 pages).

determining a first difference between the positional information of the tracking point in each of the two adjacent frames of gesture images — S410 determining a second difference between the positional information of the maximum value pixel point in each of the two adjacent frames of gesture images — S420 determining whether the gesture shaking occurs based on the first difference and the second difference — S430

Fig. 3 sampling each of the two adjacent frames of gesture images to obtain at least one detection image for each of the two adjacent frames of gesture images — S310 constructing a detection area centering on the tracking point in each of the at least one detection image and each of the original detection images — S320 comparing all pixel values of pixel points in the detection area sequentially to determine the maximum value pixel point in each of the two adjacent frames of gesture images — S330

Fig. 4

GESTURE SHAKING RECOGNITION METHOD AND APPARATUS, AND GESTURE RECOGNITION METHOD

CROSS-REFERENCE TO RELATED APPLICATIONS

This application claims benefit of the filing date of Chinese Patent Application No. 201810264119.8 filed on Mar. 28, 2018, the disclosure of which is hereby incorporated in its entirety by reference.

TECHNICAL FIELD

This disclosure relates to image recognition technology, and in particular, to a gesture shaking recognition method and apparatus, and a gesture recognition method.

BACKGROUND

In usage scenarios of virtual reality (VR) and other application developed with gestures, there is possibility of hand shaking during hand movement. In the prior art, the hand shaking may be suppressed relying on a single standard or by in a full range calculation. However, such a method of using a single standard or a full range calculation can not only make the standard in the calculation process not stable, but also result in incorrect calculation results and increases calculation time. When suppression of hand shaking is based on the full range calculation, since the entire gesture area needs to be considered and searched, the calculation is greatly increased, thereby resulting in poor human-computer interaction experience.

BRIEF SUMMARY

An embodiment of the present disclosure provides a gesture shaking recognition method. The gesture shaking recognition method may include acquiring two adjacent frames of gesture images of a gesture, selecting a tracking point in each of the two adjacent frames of gesture images, the tracking point in each of the two adjacent frames of gesture images corresponding to a same position on the gesture, determining positional information of a maximum value pixel point in each of the two adjacent frames of gesture images based on the tracking point, and determining whether gesture shaking occurs based on the positional information of the maximum value pixel point in each of the two adjacent frames of gesture images and positional information of the tracking point in each of the two adjacent frames of gesture images.

Optionally, determining whether gesture shaking occurs based on the positional information of the maximum value pixel point in each of the two adjacent frames of gesture images and the positional information of the tracking point in each of the two adjacent frames of gesture images comprises determining a first difference between the positional information of the tracking point in each of the two adjacent frames of gesture images, determining a second difference between the positional information of the maximum value pixel point in each of the two adjacent frames of gesture images, and determining whether the gesture shaking occurs based on the first difference and the second difference.

Optionally, determining whether the gesture shaking occurs based on the first difference and the second difference comprises determining that the gesture shaking occurs when a product of the first difference and the second difference is less than zero.

Optionally, determining whether the gesture shaking occurs based on the first difference and the second difference comprises determining that the gesture shaking occurs when a product of the first difference and the second difference is greater than or equal to zero, an absolute value of the first difference is less than a first threshold, and an absolute value of the second difference is less than a second threshold. In one embodiment, the first threshold is 7 and the second threshold is 5.

Optionally, determining the positional information of a maximum value pixel point in each of the two adjacent frames of gesture images based on the tracking point comprises sampling each of the two adjacent frames of gesture images to obtain at least one detection image for each of the two adjacent frames of gesture images, the two adjacent frames of gesture images being as original detection images, constructing a detection area centering on the tracking point in each of the at least one detection image and each of the original detection images, and comparing all pixel values of pixel points in the detection area sequentially to determine the maximum value pixel point in each of the two adjacent frames of gesture images.

Optionally, comparing all pixel values of pixel points in the detection area sequentially to determine the maximum value pixel point in each of the two adjacent frames of gesture images comprises traversing a current pixel point in a detection area in one of the at least one detection image and the original detection images, acquiring a plurality of pixel points adjacent to the current pixel point traversed, the current pixel point being a center of the plurality of pixel points, acquiring another pixel point and another plurality of pixel points adjacent to the another pixel point in each of the remaining detection image and original detection images, the another pixel point corresponding to the current pixel point, and the another plurality of pixel points corresponding to the plurality of pixel points adjacent to the current pixel point respectively, and determining whether a pixel value of the current pixel point is the largest among pixel values of the plurality of pixel points adjacent to the current pixel point, a pixel value of the another pixel point and pixel values of the another plurality of pixel points in each of the remaining detection image and original detection images.

Optionally, the gesture shaking recognition method further includes, when the pixel value of the current pixel point is the largest, extracting positional information of the current pixel point into an extreme value array, the current pixel point being an extreme value pixel point, and the position information of the current pixel point being an element of the extreme value array.

Optionally, the gesture shaking recognition method further includes sequentially comparing pixel values corresponding to elements in the extreme value array to determine the positional information of the maximum value pixel point in each of the two adjacent frames of gesture images.

Optionally, when the extreme value array has zero element, the position information of extreme value pixel point is re-determined based on the tracking point.

Optionally, sequentially comparing pixel values corresponding to elements in the extreme value array to determine the positional information of the maximum value pixel point in each of the two adjacent frames of gesture images comprises traversing all elements of the extreme value array, the number of elements in the extreme value array being greater than one, determining a distance between each pixel point corresponding to each of the elements and the tracking point, and comparing the distance between each pixel point corresponding to each of the elements and the tracking point to acquire a pixel point having the smallest distance, and the pixel point having the smallest distance being the maximum value pixel point.

Optionally, the gesture shaking recognition, before acquiring two adjacent frames of gesture images of the gesture, includes acquiring two adjacent frames of original images of the gesture and constructing a square area as the detection area with a center being the tracking point and a side length being one-fifth of a side length of an original image box.

Optionally, another example of the present disclosure includes a gesture recognition method comprising the gesture shaking recognition method according to one embodiment of the present disclosure to determine whether a gesture shaking occurs.

Optionally, the gesture recognition method further includes, when the gesture shaking occurs, for the two adjacent frames of images comprising a previous frame of image and a next frame of image, the next frame of image is processed by image parameters corresponding to the previous frame of image.

Another example of the present disclosure is a gesture shaking recognition apparatus. The gesture shaking recognition apparatus includes an image acquisition module configured to acquire two adjacent frames of gesture images of a gesture, a tracking point selection module configured to select a tracking point in each of the two adjacent frames of gesture images, wherein the tracking point in each of the two adjacent frames of gesture images corresponding to a same position on the gesture, a maximum value pixel point acquisition module configured to determine, based on the tracking point, positional information of a maximum value pixel point in each of the two adjacent frames of gesture images, and a determination module configured to determine whether the gesture shaking occurs based on the positional information of the maximum value pixel point and the position information of the tracking point in each of the two adjacent frames of the gesture images.

Another example of the present disclosure is a computer readable storage medium storing a computer program that, when executed, implements the steps of the gesture shaking recognition method according to one embodiment of the present disclosure.

Another example of the present disclosure is a gesture shaking recognition apparatus comprising a processor and a memory, the memory being configured to store a computer program that, when the computer program is executed by the processor, implements the steps of the gesture shaking recognition method according to one embodiment of the present disclosure.

Another example of the present disclosure is a gesture recognition apparatus, comprising a camera device and the computer readable storage medium according to one embodiment of the present disclosure or the gesture shaking recognition apparatus according to one embodiment of the present disclosure being connected to the camera device, wherein the camera device is configured to collect an image stream comprising the two adjacent frames of the gesture images

BRIEF DESCRIPTION OF THE DRAWINGS

The foregoing and other objects, features, and advantages of the disclosure are apparent from the following detailed description taken in conjunction with the accompanying drawings in which:

FIG. 3 is a flowchart of a gesture shaking recognition method according to one embodiment of the present disclosure;

FIG. 4 is a flowchart of a gesture shaking recognition method according to one embodiment of the present disclosure;

DETAILED DESCRIPTION

Figure 1:
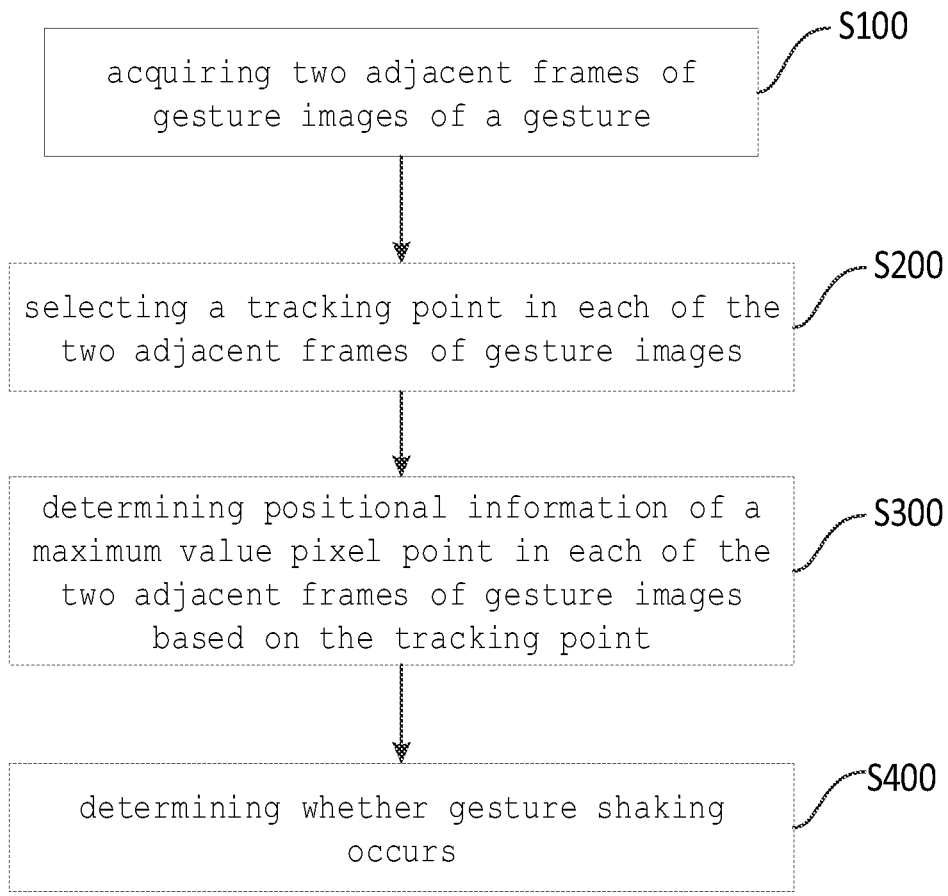
FIG. 1 is a flow chart of an embodiment of a gesture shaking recognition method according to one embodiment of the present disclosure.

The present disclosure will be described in further detail with reference to the accompanying drawings and embodiments in order to provide a better understanding by those skilled in the art of the technical solutions of the present disclosure. Throughout the description of the disclosure, reference is made to FIGS. 1-8. When referring to the figures, like structures and elements shown throughout are indicated with like reference numerals.

Those skilled in the art can understand that, the singular forms "a/an", "the" and "said" may include the plural forms unless specifically stated. It is to be further understood that the phrase "comprise" or "include" used in the disclosure indicates the inclusion of the features, integers, steps, operations, components, and/or groups thereof, but does not exclude the possibility of including or adding one or more other features, integers, steps, operations, components, and/or groups thereof. It should be understood that when an element is referred to as being "connected" or "coupled" to another element, it can be directly connected or coupled to the other element, or the intermediate elements exist. Further, "connected" or "coupled" as used herein may include either a wireless connection or a wireless coupling. The term "and/or" used herein includes all or any of the elements and all combinations of one or more of the associated list.

Those skilled in the art will appreciate that all terms (including technical and scientific terms) used herein have the same meaning as commonly understood by one of ordinary skill in the art to which the disclosure belongs, unless otherwise defined. It should also be understood that terms such as those defined in a general dictionary should be understood to have the meaning consistent with the meaning in the context of the prior art, and will not be explained as idealized or excessive formal meaning, unless specifically defined as here.

A gesture shaking recognition method is provided according to one embodiment of the present disclosure. As shown in FIG. 1, the gesture shaking recognition method includes steps S100 to S400.

Step S100 includes acquiring two adjacent frames of gesture images of a gesture.

Step S200 includes selecting a tracking point in each of the two adjacent frames of gesture images, where the selected tracking points in the two adjacent frames of gesture images correspond to a same position on the gesture.

Step S300 includes determining positional information of a maximum value pixel point, that is, a pixel point corresponding to a maximum pixel value, in each of the two adjacent frames of gesture images based on the tracking points.

Step S400 includes determining whether the gesture is shaking based on the corresponding positional information of the maximum value pixel points and the positional information of the tracking points in the two adjacent frames of gesture images.

In the implementation process according to one embodiment of the present disclosure, a camera device captures images, and the gesture shaking recognition method is performed based on the images captured by the camera device. In the implementation process, the system for performing the gesture shaking recognition method is initialized, and the initial parameters of the system are adjusted to facilitate subsequent processing of the images based on the system with the adjusted parameters. After the system initialization is completed, the parameters such as the frame rate of the camera device, the size of the video image, etc. are set, and some parameters of the system or the fixed device can be uniformly set. As such, the steps of image processing can be reduced, thereby improving accuracy of the image processing.

Figure 2A:
FIG. 2(a) is an original image of a gesture image according to one embodiment of the present disclosure.
Figure 2B:
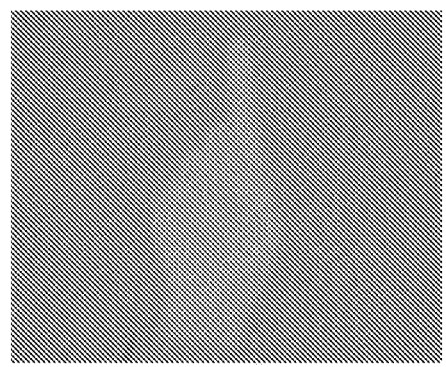
FIG. 2(b) is a YCrCb image with Cr channel extracted according to one embodiment of the present disclosure.
Figure 2C:
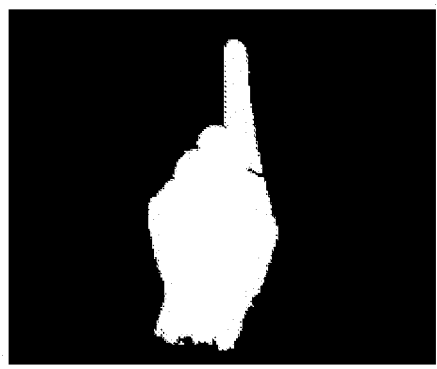
FIG. 2(c) is an image of a hand contour segmented using an otsu algorithm according to one embodiment of the present disclosure.
Figure 2D:
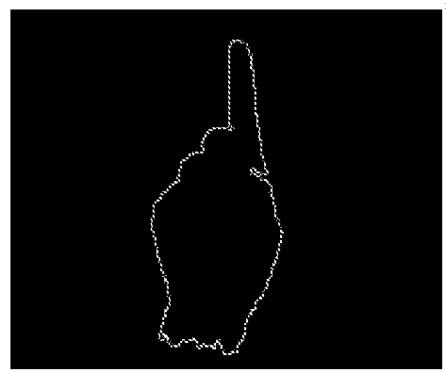
FIG. 2(d) is a contour image of the hand calculated from FIG. 2(c)

Since the present disclosure is mainly related to the human-computer interaction process in the AR virtual scene, the camera device mainly captures a gesture image stream of the user in the human-computer interaction process, and acquires the gesture images from the gesture image stream. In one embodiment, as shown in FIG. 2(a), the image stream is transmitted to an image processing determination device (a gesture shaking recognition device), and two adjacent frames of gesture images are acquired from the image stream (video stream) captured by the camera device which includes the user's gesture image stream. In order to facilitate determination of gesture shaking, and reduce cumbersome steps and promote accuracy of gesture shaking determination, the gesture images are pre-processed by some techniques such as Gaussian filtering or image noise reduction. In addition, the gesture images are processed as much as possible into images having a single color signal component. After the foregoing processes, the current frame of the gesture image is converted into an YCrCb color space with the Cr channel extracted, as shown in FIG. 2(b)). Then, the image is binarized. On the basis of binarization, the area of the hand is segmented out of the gesture image. For example, an otsu algorithm is used to segment the area of the hand, as shown in FIG. 2(c), and a contour of the hand is extracted from the area of the hand, as shown in FIG. 2(d)).

The extracted contour of the hand is recorded as a hand contour. The area outside the hand contour and enclosed in the rectangular box is termed as an area of the gesture image box, that is, an area surrounding the hand contour image and inside the outer box, wherein the gesture image is the image shown in FIG. 2(d), that is, the hand contour image in an embodiment of the present disclosure.

In order to facilitate comparison, it is necessary to extract a reference point in the hand contour image. For example, the target is a hand, and the reference point is a tracking point in the embodiment of the present disclosure, so that each image has the same tracking point as the reference point during processing, which facilitates the image comparison, determination, and recognition. That is, in the gesture shaking recognition method in the embodiment of the present disclosure, the tracking point of each frame of image corresponds to the same position on the target object (hand). Specifically, in the gesture shaking recognition method according to one embodiment of the present disclosure, since the hand can be regarded as motion of a semi-rigid object, the shape of the hand in the image often changes due to the flexibility of the finger. As a result, the motion pattern is irregular. However, the wrist is less deformed in the image. During the movement of the hand, the wrist is relatively more stable comparing to the fingers due to the characteristics of clothing shielding and small deformation. Therefore, the lower left corner of the hand contour can be selected as the tracking point (handPos), and the tracking point records the position of the hand gesture detected each time from the image.

After the tracking point is determined, the position of the hand gesture is determined based on the tracking point. A detection area is constructed based on the tracking point as a reference, and a maximum pixel value in a frame of image is determined by traversing and calculating the pixel values of the pixel points in the detection area. The maximum pixel value is converted into a gray value after the binarization process described above, and the maximum pixel value is the maximum gray value in the detection region in the current frame of image. The positional information of the pixel corresponds to the maximum pixel value is the positional information of maximum value pixel point, and the maximum pixel value is the maximum pixel value in the current frame of the hand gesture, and the positional information of the pixel point corresponding to the maximum pixel value is termed maxValue. The positional information of the pixels corresponding to the maximum pixel values in the two adjacent frames of gesture images respectively (i.e., positional information of the maximum value pixel point) is compared to determine whether the gesture shaking occurs. In the determination process, whether the gesture shaking occurs is determined based on the difference between the position information of the maximum value pixel points of the two adjacent frames of gesture images and the difference between the positions of the tracking points in the two adjacent frames of gesture images. The detailed process thereof is described later.

In the embodiments of the present disclosure, the adjacent two frames of images are interval frames for which the user presets for the gesture image determination, and the adjacent two frames of images are two adjacent frames in the gesture determination process. Therefore, the adjacent two frames of images may be two adjacent frames in the image stream or two interval frames that are not adjacent to each other. By processing and determination of some local pixels, it is possible to quickly and reliably determine whether the gesture shaking occurs.

Further, in one embodiment, as shown in FIG. 3, the step of determining whether or not the target is shaking based on the positional information of the maximum value pixel points and the positional information of the tracking points in the two adjacent frames of images includes steps S410 to S430 as below:

Step S410 includes comparing positional information of the tracking points in the two adjacent frames of images to determine a positional difference, a first difference, between the two tracking points;

Step S420 includes comparing positional information of the maximum value pixel points in the two adjacent frames of images to determine a positional difference, a second difference, between the two maximum value pixel points;

Step S430 includes determining whether the gesture shaking occurs based on the positional difference of the tracking points and the positional difference of the maximum value pixel points.

Furthermore, in one embodiment, the step of determining whether the gesture shaking occurs based on the positional difference of the tracking points and the positional difference of the maximum value pixel points includes the following:

When the product of the positional difference of the tracking points, that is, the first difference, and the positional difference of the maximum value pixel points, that is, the second difference, is less than zero, it is determined that the target gesture shaking occurs.

Furthermore, in one embodiment, the step of determining whether the gesture shaking occurs based on the positional difference of the tracking points and the positional difference of the maximum value pixel points includes the following:

When the product of the positional difference of the tracking points and the positional difference of the maximum value pixel points is greater than or equal to zero, and the absolute value of the positional difference of the tracking points is less than a preset positional threshold, which is a first threshold, and the absolute value of the positional difference of the maximum value pixel points is less than a preset maximum threshold, which is a second threshold, it is determined that the target gesture shaking occurs.

On the basis of the foregoing, the position information of the maximum value pixel point in a frame of gesture image is determined on the basis of the tracking point. Specifically, in the process of determining whether the gesture shaking occurs, the image of the next frame is received by the imaging device and recorded as the next frame of the image. The previous process is repeated to get new parameters such as tracking point position and maximum value pixel point, and positional information of the tracking point and the maximum value pixel point in the next frame of image is recorded as handPosNext and maxValueNext. The distance between handPos and handPosNext is recorded as disHandPos, which is the first difference. The distance between maxValue and maxValueNext is recorded as disMaxValue, which is the second difference. In the process of making a specific determination, the following process is implemented:

Specifically, the calculation method is disHandPos=handPosNext−handPos, disMaxValue=maxValueNext−maxValue.

Whether or not the hand shaking occurs is determined based on the values of disHandPos and disMaxValue.

For example, condition one: if disHandPos*disMaxValue>=0, it means that moving direction of the two points is the same, then further determination is needed. The further condition for determination is condition two. Condition two: |disHandPos|<7 and |disMaxValue|<5. When the condition 1 and the condition 2 are satisfied, the gesture is determined to be a shaking phenomenon. In addition, when the product of the values of the disHandPos and the disMaxValue does not satisfy the condition 1, the gesture can be directly determined to be a shaking phenomenon. In the foregoing cases, when the condition one is satisfied and the condition two is not satisfied, it can be determined that the gesture is not a shaking phenomenon, but a gesture movement. In the embodiments of the present disclosure, it should be noted that the inverse expression of the condition one is disHandPos*disMaxValue<0, that is, when disHandPos*disMaxValue<0, the condition 1 is not satisfied. In addition, |disHandPos|<7 and |disMaxValue|<5. In one embodiments provided by the present disclosure, the preset positional threshold is 7, and the preset maximum threshold is 5. It should be noted that the preset positional threshold and the preset maximum threshold may also be set according to actual needs, that is, the preset positional threshold being 7 and the preset maximum threshold being 5 do not limit the scope of the present disclosure.

Furthermore, in one embodiment, as shown in FIG. 4, the step of determining the positional information of the pixel point corresponding to the maximum pixel value in the gesture image based on the tracking point includes the following steps S310 to S330:

Step S310 includes sampling the image to obtain at least one detection image of the gesture image, and using the gesture image as an original detection image.

Step S320 includes constructing a detection area, which uses the tracking point as a center, in each detection image.

Step S330 includes sequentially comparing all pixel values of the pixel points in the detection areas to determine an extreme pixel value of all the detection areas.

Furthermore, in one embodiment, before the step of acquiring the two adjacent frames of gesture images, the method includes obtaining two adjacent frames of original images including the gesture and constructing a rectangular region, which uses the tracking point as a center and has a side length of one-fifth of the length of the original image box, as the detection region in each of the original images.

In one embodiment provided by the present disclosure, the gesture image is used as the original detection image, and the at least one image obtained by sampling the image is a detection image, so that a detection area can be constructed in both the original detection image and the detection images. As such, any one of the original detection image and the detection images can be traversed hereafter, and the corresponding pixel points in the detection areas of the remaining detection images can be acquired. The original image is an image obtained by binarizing the area of the hand. As can be seen from FIG. 2(c), the original image is an image that segments the area of the hand by an otsu algorithm.

In order to obtain accurate comparison, based on the image with the extracted Cr channel, the Cr image is down-sampled according to different multiples, and the detection images of Cr images of different multiples are obtained. At the same time, the detection range of image pixels is reduced, and the preferred detection area is determined. As such, the accuracy of the pixels at different multiples is improved, and accordingly, the accuracy of gesture recognition is improved. The Cr image of the original multiple is also the detection image. Therefore, in each of the detection images, a preset area centered on a tracking point is constructed as a detection area, and pixel values of pixels in the detection area are sequentially compared, and an extreme pixel value in the detection areas is determined. Further, the maximum pixel value is determined based on the pixel of the extreme pixel value, and the specific process is as described above and the following.

Figure 5A:
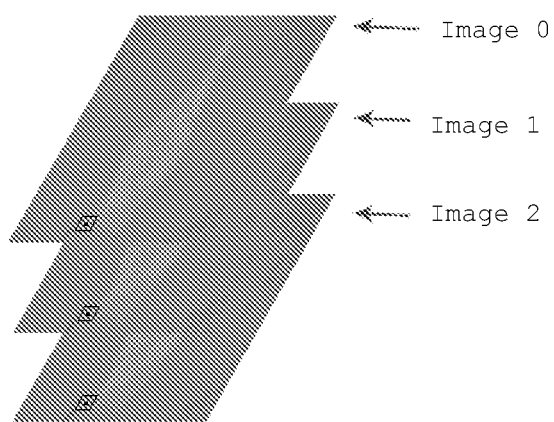
FIG. 5(a) is a detection area constructed in each of three detection images according to one embodiment of the present disclosure.
Figure 5B:
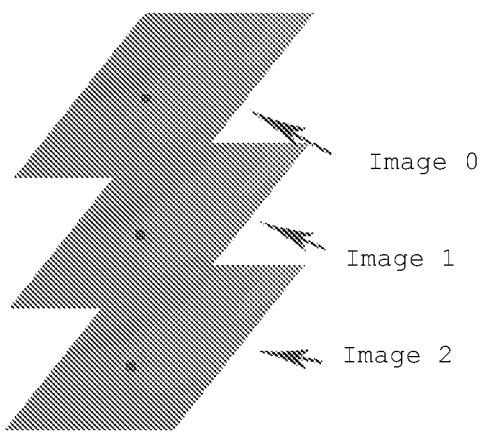
FIG. 5(b) is an enlarged image of a detection area in each of three detection images according to one embodiment of the present disclosure.

In one embodiment, in order to facilitate the processing, on the basis of filtering and extracting the Cr channel of the image, the image with extracted Cr channel is termed as image 0. The image 0 is then down-sampled by 2 times and 4 times respectively to construct two scales spaces and obtain two new images, that is, image 1 and image 2 (shown in FIG. 5(a)). The preset sampling rule is 2 times and 4 times down-sampling. According to the foregoing description, the original image is an image with the hand area segmented by an otsu algorithm (as shown in FIG. 2(c)), and a detection rectangle using the tracking point (handPos) as the center and one-fifth of the width of the gesture frame area as the side length is constructed as the detection area. As shown in the black rectangular box in FIG. 5(a), three detection rectangles are constructed in the three images respectively. The detection area is enlarged, as shown in FIG. 5(b), and the black dots in the figures are the tracking points. The extreme value is found in the detection area and is recorded as the extreme pixel value, and the positional information of the pixel corresponding to the extreme pixel value is recorded as maxValue. In the process of constructing the detection areas to find the extreme pixel value, the size of the detection areas directly affects the search of the extreme pixel value. The activity of the hand will cause the size of the detection area to change. In one embodiment, the box with a side length of one-fifth of the width of the gesture box is the most suitable size. Adopting one-fifth of the width of the gesture box can balance the detection speed and accuracy during the detection process. That is, the detection speed is fast enough, and at the same time, it is ensured that the detected gesture can accurately determine whether the user's unintentional shaking or the user's intentional movement occurs. The detection area is the area in the detection image for detecting the extreme pixel value.

Figure 6:
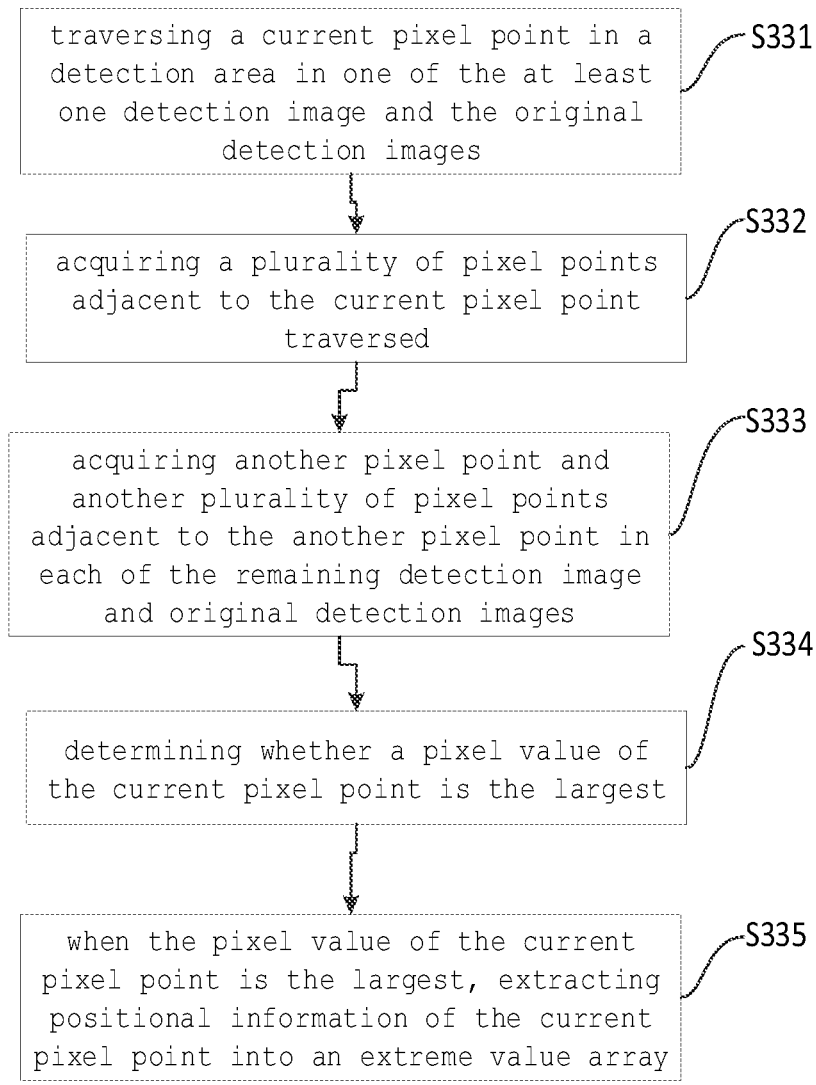
FIG. 6 is a flowchart of a gesture shaking recognition method according to one embodiment of the present disclosure.

Further, in one embodiment, as shown in FIG. 6, step S330 of sequentially comparing the pixel values of pixels in the detection area and determining the extreme pixel value in the detection area includes steps S331 to S335.

Steps S331 includes traversing the pixel points in the detection area of any one of the detection images;

S332 includes using a current pixel point traversed as a center to obtain a plurality of pixel points adjacent to the current pixel point.

S333 includes acquiring, in each of the remaining detection images, a pixel point corresponding to the current pixel point and a plurality of adjacent pixel points corresponding to the pixel points adjacent to the current pixel point.

S334 includes comparing the pixel value of the current pixel point with those of the pixel points adjacent to the current pixel point, the pixel point corresponding to the current pixel point and the adjacent pixel points corresponding to the pixel points adjacent to the current pixel point in the remaining detection images to determine whether the pixel value of the current pixel point is the largest.

S335 includes, when the pixel value of the current pixel point is the largest, extracting the positional information of the current pixel point into a preset extreme value array and obtain an extreme value array. The current pixel point is determined as the extreme value pixel point, and the positional information of the current pixel point is an element of the extreme value array.

Further, in one embodiment, after the step of determining the positional information of the pixel point corresponding to the extreme pixel value in the image based on the tracking point, the method includes sequentially comparing the pixel values corresponding to the elements in the extreme value array to determine positional information of the pixel corresponding to the maximum pixel value in the image.

According to the foregoing description, an area enclosed by the detection area in any one of the detection images may be traversed, and the detection image may be the original detection image or a detection image generated by sampling the original image. When the detection image traversed is the original detection image, the pixel point corresponding to the current pixel point traversed and the pixel points corresponding to the pixel points adjacent to the current pixel are acquired in the detection images generated by sampling the original image. When the traversed image is any one of the detected images generated by sampling the original image, a pixel point corresponding to the current pixel point traversed and pixel points corresponding to the pixel points adjacent to the current pixel point in the remaining detected images and the original detection image are obtained. In order to make the pixel value obtained after the comparison more accurate, in the preferred detection area, the pixel values of the pixel points in the same detection area are sequentially traversed and compared, so that the obtained maximum pixel value is a maximum pixel value that is preferred and reflects shaking of the gesture. Therefore, in addition to this, it is preferable to traverse the image 1 from the second row and the second column to the 19th row and the 19th column. Preferably, in the embodiment of the present disclosure, the partial image size is 20*20 pixels, and the traversing template is 3*3 pixels. Thus, it is necessary to leave a circle of pixels at the edges of the image to avoid empty pixels during comparison. Accordingly, the image 1 is traversed from the second row and the second column to the 19th row and 19th column.

In addition, in one embodiment of the present disclosure, when the criteria of the respective determination conditions are all set based on the image 1, the image 1 is preferentially traversed to lower the detection error. That is, in the implementation of the present disclosure, during the subsequent process of determining whether the shaking of the image occurs, if image 2 or image 0 is used as the traversing image, since they are ½ or 4 times of image 1 respectively, the pixel value of image 2 is twice as large as that of image 1, and the pixel value of the image 0 is twice as small as that of the image 1. The condition 1 and the condition 2 for determining whether or not the image shaking occurs are designed based on the pixel values of the image 1. When the magnitude of enlargement and reduction of the image is large, reconstruction or interpolation occurs between adjacent pixel values, thereby resulting in a large change in pixel values and lowering accuracy of the pixel values. Therefore, when the criteria of the determination condition is fixed, if the pixels corresponding to the pixel values of other images are used for determination, there may be a case where the pixel values change too large and accuracy of the pixel values is low, thereby lowering credibility of the final determination that gesture shaking or moving occurs. When this is applied to conditions 1 and 2 or other steps related to conditions 1 and 2, the accuracy of the final determination is not high and the error is relatively large. Therefore, the image based on which the criteria of the determination are designed should be used as the image traversed. Since image 0 and image 2 are images at different magnification of image 1, for pixel point 1 in each traversed image 1, there are corresponding pixel point 0 in image 0 and corresponding pixel point 2 in image 2. That is, the pixel point 0 is in image 0. The pixel point 1 is in image 1 and corresponds to pixel point 0. The pixel point 2 is in image 2 and also corresponds to pixel point 0. The pixel point 0, the pixel point 1, and the pixel point 2 respectively correspond to the names or identifiers of the pixel points in the image 0, the image 1, and the image 2, and may be replaced by other symbols.

Figure 5C:
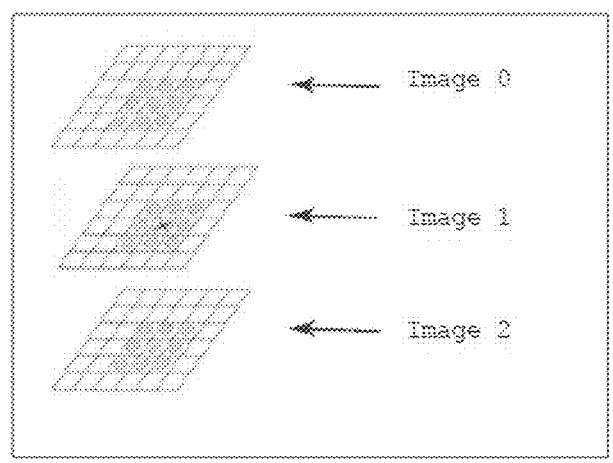
FIG. 5(c) is a nine-square grid pixel image constructed by corresponding adjacent pixel points in each of three detection images according to one embodiment of the present disclosure.

In one embodiment, after the pixel point 0, pixel point 1, and pixel point 2 are found in image 0, image 1, and image 2 respectively, the nine-square grid images centered on pixel point 0, pixel point 1, and pixel point 2 respectively have a total of 27 pixels (As shown in FIG. 5(c)). It is then determined whether the value of pixel 1 is the largest among the 27 pixel values. If so, pixel 1 is added to the preset extreme value array, and the extreme value of pixel 1 is an element of the preset extreme value array. Accordingly, the elements of the preset extreme value array are obtained. It should be noted that, in the embodiment of the present disclosure, if the image 0 is used as the traversed image, and the determination condition is also designed based on the image 0, when the image 0 is traversed, there are pixel points in the image 1 and the image 2 corresponding to the current pixel in the image 0 traversed. In combination with the foregoing description, the image based on which the determination condition is designed is used as the image traversed, thereby improving the accuracy of the gesture determination. As such, the impact of reconstruction and interpolation calculation in other images on the result of image determination can be avoided. In addition, in the embodiment of the present disclosure, the image 1 is used as the traversed image. The condition of the image determination is designed based on the image 1. Furthermore, at the same time, the down-sampling of the image 1 is equivalent to denoising image 0 once again, thereby preventing the noise in the image from influencing the determination result. Therefore, in one embodiment of the present disclosure, image 1 is used as the traversed image.

After the traversing of the detection area is completed, the elements for the preset extreme value array are obtained and extracted into the preset extreme value array. Accordingly, an extreme value array is obtained. The elements in the extreme value array are sequentially compared to obtain a pixel point corresponding to the maximum pixel value in the image. The specific process is described later.

Further, in one embodiment, after the process of determining a maximum pixel value of the image based on the tracking point, the method includes:

When the number of elements in the preset extreme value array is zero, the positional information of the pixel corresponding to the maximum pixel value in the image is determined again based on the tracking point.

When the number of elements in the preset extreme value array is zero, combined with the foregoing description, it is indicated that when the image 1 is traversed, the pixel having the largest pixel value is not found in the detection area of the image 1. Thus, by performing steps S331 to S335 again, the positional information of the pixel point corresponding to the maximum pixel value in the image is determined again. Specifically, it is preferred to traverse again (i.e., the second time) the area enclosed by the detection area in the detection image traversed in the step S331 (such as the area enclosed by the detection area in the image 1), thereby avoiding missing some pixel points in a part of the detection area so that the pixel point having the largest pixel value in the detection area could not be determined when the image 1 is traversed during the first time.

Thus, the image 1 is traversed a second time, and the positional information of the pixel point corresponding to the maximum pixel value in the image is determined by the steps S332 to S335 for the second time. The specific process is the same as the description of steps S331 to S335, and the details thereof are not described again herein.

Further, in one embodiment, after the process of determining a pixel point correspond to a maximum pixel value in the image based on the tracking point, the method includes the following:

When the number of elements in the preset extreme value array is greater than one, all elements of the extreme value array are traversed. Then, a distance between each of pixel points corresponding to the elements and the tracking point is respectively determined. Then, the distance between each of pixel points corresponding to the elements and the tracking point is compared to one another and a pixel point having the smallest distance from the tracking point is acquired. Then, the corresponding positional information of the pixel point having the smallest distance is determined as the positional information of the pixel point corresponding to the maximum pixel value in the image.

In the embodiments of the present disclosure, for the extreme value array, if the number of elements in the extreme value array is 0, it means that the current frame of image has no extreme pixel value. At this time, image 1 is re-traversed to find an extreme pixel value, which is then added to the extreme value array. When the number of elements in the extreme value array is 1, it means that the value is the maximum pixel value. When the number of elements in the extreme value array is greater than 1, it means that there is a plurality of maximum pixel values. The distance between each element and the tracking point is calculated and compared, and the pixel point having the smallest distance is obtained. The positional information of the pixel point having the smallest distance is then determined as the positional information of the pixel point corresponding to the maximum pixel value.

One example of the present disclosure is a gesture recognition method. The gesture recognition method includes determining whether a gesture shaking occurs using the gesture shaking recognition method according to any one of the embodiments of the present disclosure and, when the gesture shaking occurs, processing the next frame of image by image parameters corresponding to the previous frame of image of the two adjacent frames of images.

In one embodiment, after the gesture shaking is determined to have occurred based on the gesture image, the parameters corresponding to the image of the next frame are updated by all parameters of the camera device capturing the current gesture image. That is, the image of the next frame is also the image taken by the camera device. The image parameters include, for example, a position of the selected tracking point in the embodiment of the present disclosure. For example, when it is determined that the gesture shaking does not occur, the position of the tracking point selected in the current frame of image is determined as the position of the tracking point selected in the next frame of image. When the shaking occurs, the position of the tracking point in the next frame of image is determined based on the difference disHandPos of the positions of the tracking points in the adjacent two frames of images. For example, when the difference disHandPos is −2, in the next frame, the tracking point moves by two pixels to the right in a straight line. If the tracking point after the moving is not on the gesture contour, the tracking point moves up or down to make the tracking point on the gesture contour.

Figure 7:
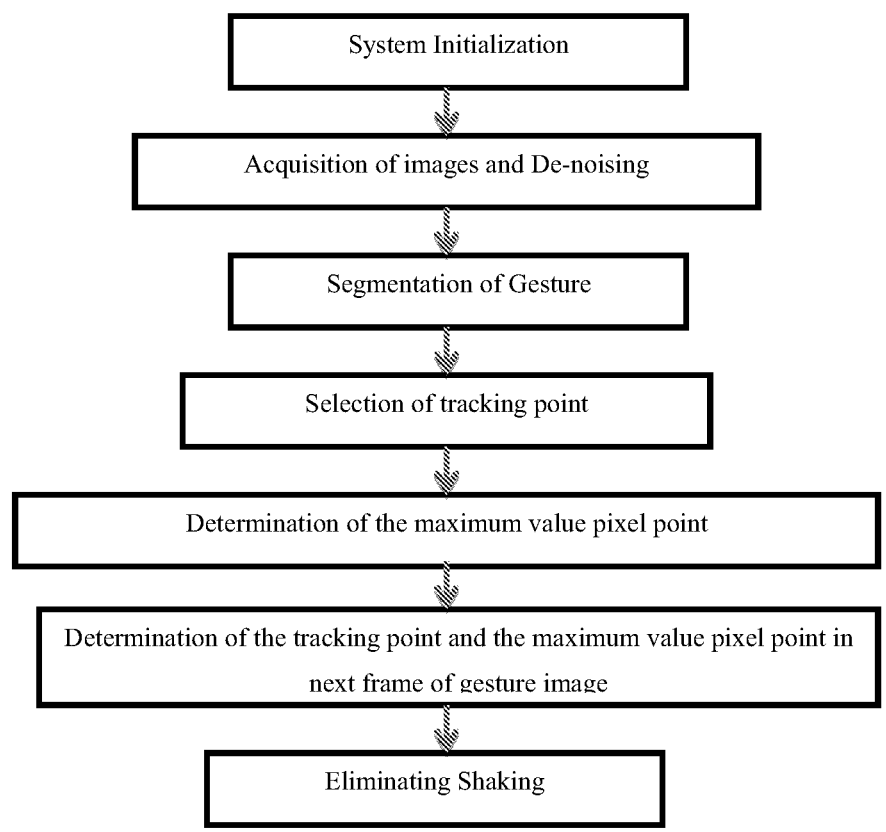
FIG. 7 is a schematic flowchart of gesture recognition method according to one embodiment of the present disclosure.

In the embodiments provided by the present disclosure, in combination with the foregoing description, the gesture recognition method includes the following process. As shown in FIG. 7, first, the detection system is initialized so that, for example, a frame rate of the camera, and a video image size, etc. are set. The frame rate of the camera is set to facilitate processing the images in sequence and to find the pixel point having the maximum pixel value in the detection area of the image (i.e., the extreme points in FIG. 7). The video image size is set to facilitate obtaining and processing an image of a suitable size. After the camera captures one frame of image, the camera device sends the frame of the image into the gesture shaking recognition device to perform the gesture shaking recognition method according to one embodiment of the present disclosure. For example, Gaussian filtering is performed on the frame of the image to reduce image noise and avoid the influence of noise on extracting or segmenting the gesture image. Then, the frame of the image is converted into the YCrCb color space, the Cr channel is extracted for processing, and the otsu algorithm is used to segment the area of the hand. That is, the pixel points on the gesture contour in the image are processed to have a same pixel value, and the remaining pixel points outside the gesture contour are processed to have another pixel value, which has a large difference from the pixel value of the pixel points on the gesture contour. The large difference facilitates the otsu algorithm to segment the gesture contour image. After the gesture contour image is segmented, the position of the tracking point in the current frame of image is obtained and the extreme value point of the gesture image is found by using the preceding gesture shaking recognition method according to one embodiment of the present disclosure. After the gesture image of the current frame is determined, the image of the next frame is captured by the camera. Then, the foregoing process is performed on the image of the next frame to acquire the tracking point and the extreme value point of the gesture image of the next frame. Then, the difference between the positions of the tracking points in the two frames of images and the difference between the extreme value points in the two frames of images are obtained. In combination with the foregoing condition 1 and condition 2, whether the gesture shaking in a frame of image occurs is determined. When the shaking occurs, based on the position of the tracking point of the current frame of the image and the difference of positions of the tracking points in the two frames of images, the position of the tracking point in the next frame of the image is adjusted to eliminate shaking, thereby improving the stability of the motion trajectory of the gesture in the process of human-computer interaction and the customers person-machine interaction experience.

Figure 8:
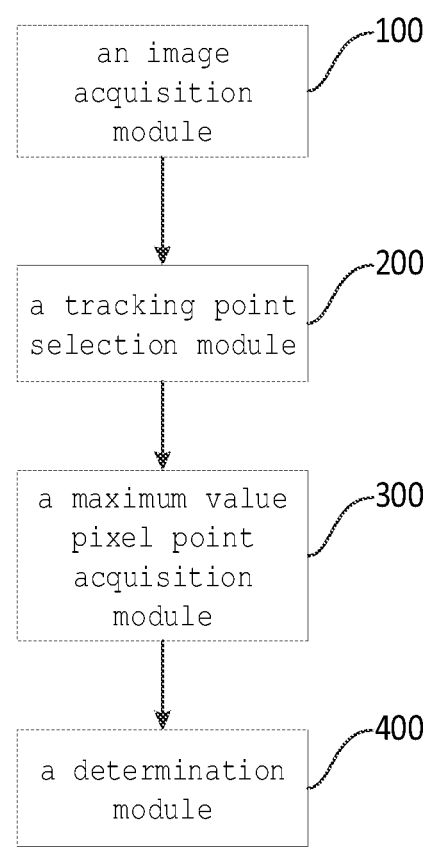
FIG. 8 is a schematic structural diagram of a gesture shaking recognition apparatus according to one embodiment of the present disclosure.

One embodiment of the present disclosure provides a gesture shaking recognition apparatus. As shown in FIG. 8, the gesture shaking recognition apparatus includes an image acquisition module 100, a tracking point selection module 200, a maximum pixel value acquisition module 300, and a determination module 400.

The image acquisition module 100 is configured to acquire two adjacent frames of gesture images.

The tracking point selection module 200 is configured to select a tracking point in each frame of gesture images, wherein the selected tracking point in each frame of the gesture images corresponds to the same position on the gesture.

The maximum value pixel point acquisition module 300 is configured to determine, based on the tracking point, the positional information of the pixel point corresponding to a maximum pixel value in the image, that is, the position information of the pixel point having the maximum pixel value.

The determination module 400 is configured to determine whether the gesture shaking occurs based on the positional information of the pixel points corresponding to the maximum pixel values and the positional information of the corresponding tracking points in the two adjacent images.

Another embodiment of the present disclosure further provides a computer readable storage medium storing a computer program that, when executed, implements the steps of the gesture shaking recognition method of any one of the embodiments of the present disclosure.

Another embodiment of the present disclosure provides a gesture recognition apparatus. In one embodiment, the apparatus includes a processor and a memory. The memory is used for storing a computer program, and when the computer program is executed by the processor, the steps of the gesture shaking recognition method of any one of the embodiments of the present disclosure are implemented.

In another embodiment, the gesture recognition apparatus includes a camera device and a computer readable storage medium or a gesture shaking recognition device connected to the camera device. The camera device is configured to collect an image stream comprising a plurality of the gesture images. The image stream is composed of a plurality of frames of images, wherein at least two frames of the images include a gesture. The gesture image is the image formed after a frame of the image in the image stream is processed.

In addition, each functional module in the embodiments of the present disclosure may be integrated into one processing module, or each module may exist physically separately, or two or more modules may be integrated into one module. The above integrated modules can be implemented in the form of hardware or in the form of software functional modules. The integrated modules, if implemented in the form of software functional modules and sold or used as separate products, may also be stored in a computer readable storage medium.

The storage medium mentioned above may be a read only memory, a magnetic disk or an optical disk or the like.

The principle and the embodiment of the present disclosures are set forth in the specification. The description of the embodiments of the present disclosure is only used to help understand the method of the present disclosure and the core idea thereof. Meanwhile, for a person of ordinary skill in the art, the disclosure relates to the scope of the disclosure, and the technical scheme is not limited to the specific combination of the technical features, and also should covered other technical schemes which are formed by combining the technical features or the equivalent features of the technical features without departing from the inventive concept. For example, technical scheme may be obtained by replacing the features described above as disclosed in this disclosure (but not limited to) with similar features.

What is claimed is:

1. A gesture shaking recognition method, comprising:
   acquiring two adjacent frames of gesture images of a gesture;
   selecting a tracking point in each of the two adjacent frames of gesture images, the tracking point in each of the two adjacent frames of gesture images corresponding to a same position on the gesture;
   determining positional information of a maximum value pixel point in each of the two adjacent frames of gesture images based on the tracking point; and determining whether gesture shaking occurs based on the positional information of the maximum value pixel point in each of the two adjacent frames of gesture images and positional information of the tracking point in each of the two adjacent frames of gesture images.

2. A non-transitory computer readable storage medium storing a computer program that, when executed, implements the steps of the gesture shaking recognition method according to claim 1.

3. A gesture shaking recognition apparatus, comprising a processor and a memory, the memory being configured to store a computer program that, when the computer program is executed by the processor, implements the steps of the gesture shaking recognition method according to claim 1.

4. A gesture recognition method, comprising:
the gesture shaking recognition method according to claim 1 to determine whether a gesture shaking occurs.

5. The gesture recognition method of claim 4, further comprising:
when the gesture shaking occurs, for the two adjacent frames of images comprising a previous frame of image and a next frame of image, the next frame of image is processed by image parameters corresponding to the previous frame of image.

6. The gesture shaking recognition method according to claim 1, wherein determining whether gesture shaking occurs based on the positional information of the maximum value pixel point in each of the two adjacent frames of gesture images and the positional information of the tracking point in each of the two adjacent frames of gesture images comprises:
determining a first difference between the positional information of the tracking point in each of the two adjacent frames of gesture images;
determining a second difference between the positional information of the maximum value pixel point in each of the two adjacent frames of gesture images; and
determining whether the gesture shaking occurs based on the first difference and the second difference.

7. The gesture shaking recognition method according to claim 6, wherein determining whether the gesture shaking occurs based on the first difference and the second difference comprises:
determining that the gesture shaking occurs e a product of the first difference and the second difference is less than zero.

8. The gesture shaking recognition method according to claim 6, wherein determining whether the gesture shaking occurs based on the first difference and the second difference comprises:
determining that the gesture shaking occurs when a product of the first difference and the second difference is greater than or equal to zero, an absolute value of the first difference is less than a first threshold, and an absolute value of the second difference is less than a second threshold.

9. The gesture shaking recognition method according to claim 8, wherein the first threshold is 7 and the second threshold is 5.

10. The gesture shaking recognition method according to claim 1, wherein determining the positional information of a maximum value pixel point in each of the two adjacent frames of gesture images based on the tracking point comprises:
sampling each of the two adjacent frames of gesture images to obtain at least one detection image for each of the two adjacent frames of gesture images, the two adjacent frames of gesture images being as original detection images;
constructing a detection area centering on the tracking point in each of the at least one detection image and each of the original detection images; and
comparing all pixel values of pixel points in the detection area sequentially to determine the maximum value pixel point in each of the two adjacent frames of gesture images.

11. The gesture shaking recognition method according to claim 10, before acquiring two adjacent frames of gesture images of the gesture, comprising:
acquiring two adjacent frames of original images of the gesture, and
constructing a square area as the detection area with a center being the tracking point and a side length being one-fifth of a side length of an original image box.

12. The gesture shaking recognition method according to claim 10, wherein comparing all pixel values of pixel points in the detection area sequentially to determine the maximum value pixel point in each of the two adjacent frames of gesture images comprises:
traversing a current pixel point in a detection area in one of the at least one detection image and the original detection images;
acquiring a plurality of pixel points adjacent to the current pixel point traversed, the current pixel point being a center of the plurality of pixel points;
acquiring another pixel point and another plurality of pixel points adjacent to the another pixel point in each of the remaining detection image and original detection images, the another pixel point corresponding to the current pixel point, and the another plurality of pixel points corresponding to the plurality of pixel points adjacent to the current pixel point respectively; and
determining whether a pixel value of the current pixel point is the largest among pixel values of the plurality of pixel points adjacent to the current pixel point, a pixel value of the another pixel point and pixel values of the another plurality of pixel points in each of the remaining detection image and original detection images.

13. The gesture shaking recognition method according to claim 12, further comprising, when the pixel value of the current pixel point is the largest, extracting positional information of the current pixel point into an extreme value array, the current pixel point being an extreme value pixel point, and the position information of the current pixel point being an element of the extreme value array.

14. The gesture shaking recognition method according to claim 13, further comprising:
sequentially comparing pixel values corresponding to elements in the extreme value array to determine the positional information of the maximum value pixel point in each of the two adjacent frames of gesture images.

15. The gesture shaking recognition method according to claim 13, wherein when the extreme value array has zero element, the position information of extreme value pixel point is re-determined based on the tracking point.

16. The gesture shaking recognition method according to claim 13, wherein sequentially comparing pixel values corresponding to elements in the extreme value array to determine the positional information of the maximum value pixel point in each of the two adjacent frames of gesture images comprises:

traversing all elements of the extreme value array, the number of elements in the extreme value array being greater than one;

determining a distance between each pixel point corresponding to each of the elements and the tracking point; and comparing the distance between each pixel point corresponding to each of the elements and the tracking point to acquire a pixel point having the smallest distance, and the pixel point having the smallest distance being the maximum value pixel point.

17. A gesture shaking recognition apparatus comprising:

an image acquisition module configured to acquire two adjacent frames of gesture images of a gesture;

a tracking point selection module configured to select a tracking point in each of the two adjacent frames of gesture images, wherein the tracking point in each of the two adjacent frames of gesture images corresponding to a same position on the gesture;

a maximum value pixel point acquisition module configured to determine, based on the tracking point, positional information of a maximum value pixel point in each of the two adjacent frames of gesture images; and a determination module configured to determine whether the gesture shaking occurs based on the positional information of the maximum value pixel point and the position information of the tracking point in each of the two adjacent frames of the gesture images.

18. A gesture recognition apparatus, comprising a camera device and the gesture shaking recognition apparatus of claim 17 being connected to the camera device, wherein the camera device is configured to collect an image stream comprising the two adjacent frames of the gesture images.

* * * * *